(12) United States Patent
Scoda et al.

(10) Patent No.: US 10,452,730 B2
(45) Date of Patent: Oct. 22, 2019

(54) METHODS FOR ANALYZING WEB SITES USING WEB SERVICES AND DEVICES THEREOF

(71) Applicant: Usablenet Inc., New York, NY (US)

(72) Inventors: Enrico Scoda, Martignacco (IT); Marco Brondani, Caporiacco (IT)

(73) Assignee: USABLENET INC., New York, NY (US)

( * ) Notice: Subject to any disclaimer, the term of this patent is extended or adjusted under 35 U.S.C. 154(b) by 578 days.

(21) Appl. No.: 14/977,995

(22) Filed: Dec. 22, 2015

(65) Prior Publication Data

US 2017/0177727 A1 Jun. 22, 2017

(51) Int. Cl.
*G06F 16/9535* (2019.01)
*G06F 16/955* (2019.01)
*G06F 16/951* (2019.01)

(52) U.S. Cl.
CPC ........ *G06F 16/9535* (2019.01); *G06F 16/951* (2019.01); *G06F 16/9566* (2019.01)

(58) Field of Classification Search
CPC ............................................... G06F 17/30861
USPC ....... 709/223, 213, 245, 201, 203, 212, 214, 709/217, 220, 221, 224, 226, 229, 230, 709/246; 719/313, 330, 316, 327, 328; 717/125, 124, 128, 100, 131, 136, 162, 717/170
See application file for complete search history.

(56) References Cited

U.S. PATENT DOCUMENTS

| 7,519,902 | B1 | 4/2009 | Kraft et al. | |
|---|---|---|---|---|
| 8,676,783 | B1* | 3/2014 | Fedorynski | G06F 17/30 707/709 |
| 2006/0026552 | A1* | 2/2006 | Mazzitelli | G06F 9/465 717/101 |
| 2007/0024919 | A1* | 2/2007 | Wong | G06F 9/5027 358/403 |
| 2011/0078703 | A1* | 3/2011 | Dokovski | G06F 17/30884 719/315 |
| 2011/0307238 | A1* | 12/2011 | Scoda | G06F 9/45529 703/26 |
| 2014/0222621 | A1* | 8/2014 | Kanani | G06Q 30/02 705/26.62 |

(Continued)

OTHER PUBLICATIONS

Extended European Search Report for corresponding European Patent Application 16203840.0, dated May 9, 2017, 8pgs.

*Primary Examiner* — Jay A Morrison
*Assistant Examiner* — Ken Hoang
(74) *Attorney, Agent, or Firm* — Pepper Hamilton LLP

(57) ABSTRACT

Methods, non-transitory computer readable media, and devices that determine when a job extracted from a stack is a pending job. When the determining indicates that the job is a pending job, a web service indicated in the job is executed. Another job is extracted from a web service response, and the another job is inserted into the stack. The web service is configured to obtain a web page to be analyzed based on the URL, execute the web page in an emulated JavaScript environment, and return the web service response. When the determining indicates that the job is not a pending job, a data collector event handler indicated in the job is executed. The data collector event handler is configured to update an output resource based on content of the analyzed web page included in the job.

18 Claims, 7 Drawing Sheets

(56) References Cited

U.S. PATENT DOCUMENTS

2015/0379014 A1* 12/2015 Xu .................. G06F 17/211
 707/711

* cited by examiner

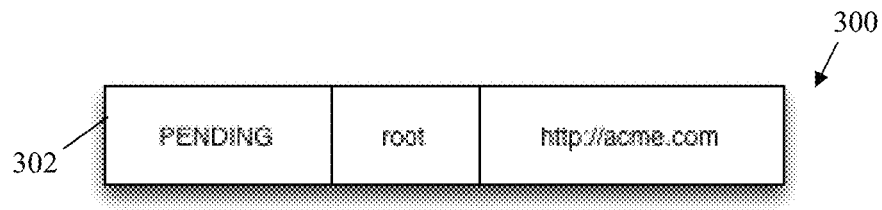
FIG. 3A
```
{
    "type": "home",
    "hash": "",                              304
    "content": null,
    "jobs": [{
        "name": "women dresses",
        "type": "PENDING",
        "action": "plp",
        "url": "http://acme.com/c2141/women_dresses",
        "curl": "http://acme.com/c2141"
    }, {
        "name": "food & wine",
        "type": "PENDING",
        "action": "plp",
        "url": "http://acme.com/c1550/food_wine",
        "curl": "http://acme.com/c1550"
    }]
}
```
FIG. 3B
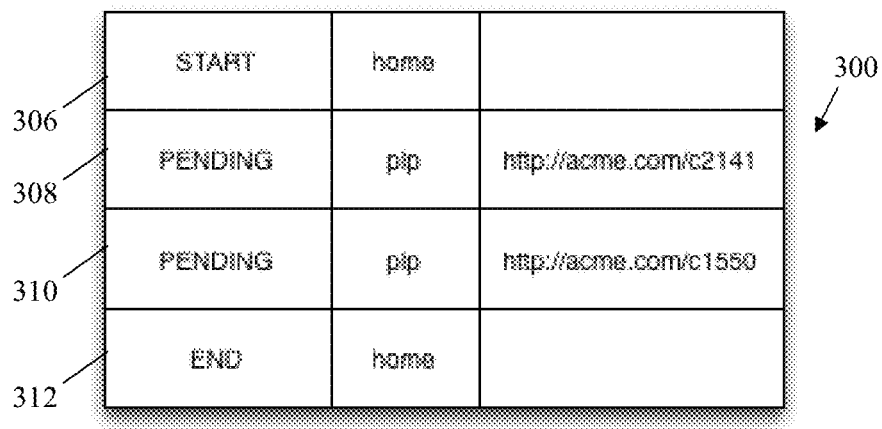
FIG. 3C

```
function home_start(job) {
    out.write('<catalog>');
}                                    38(1)

function home_end(job) {
    out.write('</catalog>');
}                                    38(2)

function plp_start(job) {
    out.write('<plp url="'  job.url  '">');
    out.write('<name>'  job.name  '</name>');
    out.write('<description>'  job.content  '</description>');
}
                                     38(3)
function plp_end(job) {
    out.write('</catalog>');
}                                    38(4)

function pdp_start(job) {
    out.write('<product>');
    out.write('<name>'  job.name  '</name>');
        (var i 0; i job.content.sizes.length; i  )
        out.write('<size>'  job.content.sizes[i]  '</size>');
        (job.content.bottles)
        out.write('<bottles>'  job.content.bottles  '</bottles>');
    out.write('<price>'  job.content.price  '</price>');
    out.write('</product>');
}                                    38(5)

function pdp_end(job) {
}                      38(6)
```

```xml
<catalog>
    <plp url="http://acme.com/c2141/women_dresses">
        <name>women dresses</name>
        <description>
            Create the perfect holiday wardrobe with 20% off
            swim and beachwear.
        </description>
        <product>
            <name>Long Sleeve Bow Dress</name>
            <size>small</size>
            <size>medium</size>
            <price>65$</price>
        </product>
        <product>
            <name>Bouclé Longline Coat</name>
            <size>small</size>
            <size>medium</size>
            <price>125$</price>
        </product>
    </plp>
    <plp url="http://acme.com/c1550/food_wine">
        <name>food & wine</name>
        <description>
            Save 25% when you raise a glass with this special
            discount on wine, champagne and beer.
        </description>
        <product>
            <name>Vinalta Malbec</name>
            <bottles>6</bottles>
            <price>48$</price>
        </product>
        <product>
            <name>Conte Priuli Prosecco</name>
            <bottles>4</bottles>
            <price>125$</price>
        </product>
    </plp>
</catalog>
```

FIG. 5

```
{
    "handler": "plp",
    "hash": "",
    "content": "Create the perfect holiday wardrobe with 20% off swim and beachwear.",
    "jobs": [{
        "name": "Long Sleeve Bow Dress",
        "type": "START",
        "handler": "pdp",
        "content": {
            "sizes": ["small", "medium"],
            "price": "65$"
        }
    }, {
        "name": "Long Sleeve Bow Dress",
        "type": "END",
        "handler": "pdp"
    }, {
        "name": "Bouclé Longline Coat",
        "type": "START",
        "handler": "pdp",
        "content": {
            "sizes": ["small", "medium"],
            "price": "125$"
        }
    }, {
        "name": "Bouclé Longline Coat",
        "type": "END",
        "handler": "pdp"
    }]
}
```

FIG. 6A

| | | |
|---|---|---|
| START | plp | |
| START | pdp | Long Sleeve Bow Dress |
| END | pdp | Long Sleeve Bow Dress |
| START | pdp | Bouclé Longline Coat |
| END | pdp | Bouclé Longline Coat |
| END | plp | |
| PENDING | plp | http://acme.com/c1550 |
| END | home | |

FIG. 6B

```
{
    "handler": "plp",
    "hash": "",
    "content": "Save 25% when you raise a glass with this special discount on wine, champagne and beer.",
    "jobs": [{
        "name": "Vinalta Malbec",
        "type": "START",
        "handler": "pdp",
        "content": {
            "price": "48$",
            "bottles": 6
        }
    }, {
        "name": "Vinalta Malbec",
        "type": "END",
        "handler": "pdp"
    }, {
        "name": "Conte Priuli Prosecco",
        "type": "START",
        "handler": "pdp",
        "content": {
            "price": "125$",
            "bottles": 4
        }
    }, {
        "name": "Conte Priuli Prosecco",
        "type": "END",
        "handler": "pdp"
    }]
}
```

700 

FIG. 7A

| | | |
|---|---|---|
| 710 START | plp | |
| 702 START | pdp | Vinalta Malbec |
| 704 END | pdp | Vinalta Malbec |
| 706 START | pdp | Conte Priuli Prosecco |
| 708 END | pdp | Conte Priuli Prosecco |
| 712 END | plp | |
| 312 END | home | |

METHODS FOR ANALYZING WEB SITES USING WEB SERVICES AND DEVICES THEREOF

BACKGROUND

Web site analyzers, which are often referred to as indexers, spiders, bots, or crawlers, for example, navigate web sites and collect information regarding their structure or content. These analyzers have many uses including identifying security threats in a web site, evaluating web pages associated with a web site for implementation quality, and producing a list or sitemap of web pages of a web site that should be indexed by search engines, for example. In some instances, analyzers can be used to generate client-facing content, such as a list of available products with current offers in a retailer web site or a static version of a retailer web site catalog that can be used as a catalog navigation menu by a mobile application associated with the retailer or web site, for example.

However, current web site analyzers are limited to inspecting static web page documents associated with web sites. As a result, current web site analyzers do not effectively execute some web pages, including those web pages that include client-side JavaScript code. More specifically, current web site analyzers are unable to extract information from web pages that is hidden inside the client-side JavaScript code. In one particular example, a catalog navigation menu may be generated, when a web page is executed client-side, by downloading and processing a JavaScript Object Notation (JSON) resource, which would not be accessible or executable by current web site analyzers. Therefore, current analyzers have limited functionality and visibility into certain web sites resulting in relatively inaccurate or incomplete results that have limited utility.

SUMMARY

A method for analyzing web sites using web services includes determining, by a web site analyzer computing device, when a job extracted from a stack is a pending job. When the determining indicates that the job is a pending job, a web service indicated in the job is executed, by the web site analyzer computing device, by passing a Uniform Resource Locator (URL) included in the job as a parameter to the web service. Another job is extracted, by the web site analyzer computing device, from a web service response, and the another job is inserted, by the web site analyzer computing device, into the stack. The web service is configured to obtain a web page to be analyzed based on the URL, execute the web page in an emulated JavaScript environment, and return the web service response. When the determining indicates that the job is not a pending job, then a data collector event handler indicated in that job is executed, by the web site analyzer computing device, by passing that job as a parameter to the data collector event handler. The data collector event handler is configured to update an output resource based on content of the analyzed web page included in that job.

A non-transitory computer readable medium having stored thereon programmed instructions for analyzing web sites using web services and includes executable code that, when executed by at least one processor, causes the processor to perform steps including determining when a job extracted from a stack is a pending job. When the determining indicates that the job is a pending job, a web service indicated in the job is executed by passing a URL included in the job as a parameter to the web service. Another job is extracted from a web service response, and the another job is inserted into the stack. The web service is configured to obtain a web page to be analyzed based on the URL, execute the web page in an emulated JavaScript environment, and return the web service response. When the determining indicates that the job is not a pending job, a data collector event handler indicated in that job is executed by passing that job as a parameter to the data collector event handler. The data collector event handler is configured to update an output resource based on content of the analyzed web page included in that job.

A web site analyzer computing device includes one or more processors coupled to a memory and configured to execute programmed instructions including and stored in the memory to determine when a job extracted from a stack is a pending job. When the determining indicates that the job is a pending job, a web service indicated in the job is executed by passing a URL included in the job as a parameter to the web service. Another job is extracted from a web service response, and the another job is inserted into the stack. The web service is configured to obtain a web page to be analyzed based on the URL, execute the web page in an emulated JavaScript environment, and return the web service response. When the determining indicates that the job is not a pending job, a data collector event handler indicated in that job is executed by passing that job as a parameter to the data collector event handler. The data collector event handler is configured to update an output resource based on content of the analyzed web page included in that job.

This technology provides a number of advantages including providing methods, non-transitory computer readable media, and web site analyzer computing devices that utilize web services and emulated JavaScript environments to more effectively analyze web pages of web sites. In particular, this technology extracts web page information, including information inside client-side JavaScript code, to facilitate a more thorough analysis of web sites. This technology also advantageously utilizes data collector event handlers that provide flexibility with respect to the type of provided output.

BRIEF DESCRIPTION OF THE DRAWINGS

FIG. 3A is an exemplary stack including a portion of a pending job generated based on a startup configuration file;

FIG. 3B is a portion of an exemplary web service response generated by the web service indicated in the exemplary pending job in the exemplary stack of FIG. 3A and using the URL of the exemplary pending job in the exemplary stack of FIG. 3A;

FIG. 3C is an exemplary stack including a portion of each of a plurality of exemplary jobs resulting from processing of the exemplary web service response of FIG. 3B;

FIG. 4 is a plurality of exemplary data collector event handlers that process a subset of the plurality of exemplary jobs included in the exemplary stacks of FIGS. 3C, 6B, and 7B.

FIG. 5 is an exemplary output resource generated by the exemplary method for analyzing web sites using web services of FIG. 2.

FIG. 6A is a portion of an exemplary web service response generated by the web service indicated in a pending one of the exemplary jobs in the exemplary stack of FIG. 3C;

FIG. 6B is an exemplary stack including a portion of each of a plurality of a plurality of exemplary jobs resulting from processing the web service response of FIG. 6A;

FIG. 7A is a portion of an exemplary web service response generated by the web service indicated in a pending one of the exemplary jobs in the exemplary stack of FIG. 6B; and FIG. 7B is an exemplary stack including a portion of each of a plurality exemplary jobs resulting from processing the web service response of FIG. 7A.

DETAILED DESCRIPTION

Figure 1:
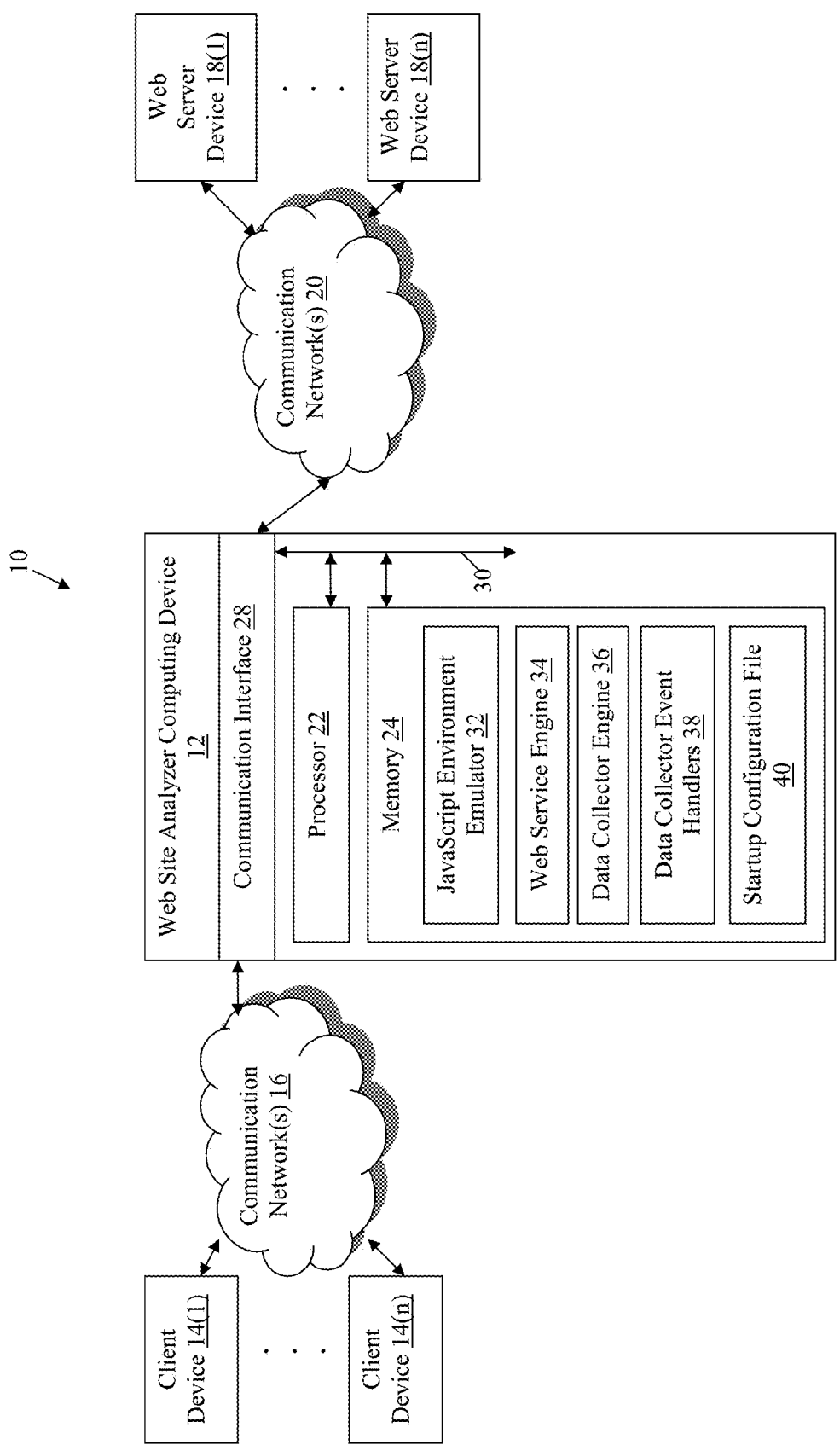
FIG. 1 is a block diagram of an environment with an exemplary web site analyzer computing device.

An exemplary environment 10 with a web site analyzer computing device 12 coupled to client devices 14(1)-14(n) via communication network(s) 16 and web server devices 18(1)-18(n) via communication networks 20 is illustrated in FIG. 1. Other numbers and types of systems, devices, and/or elements in other configurations and environments with other communication network topologies can also be used. This technology provides a number of advantages including providing methods, non-transitory computer readable media, and web site analyzer computing devices that more effectively analyze web sites using web services that execute web pages of the web sites in an emulated JavaScript environment in order to extract information from client-side JavaScript code of the web pages.

The web site analyzer computing device 12 in this particular example includes a processor 22, a memory 26, and a communication interface 28 which are coupled together by a bus 30 or other communication link, although other numbers and types of components, parts, devices, systems, and elements in other configurations and locations can be used. The processor 22 in the web site analyzer computing device 12 executes a program of stored instructions for one or more aspects of this technology as described and illustrated by way of the examples herein, although the processor 22 could execute other numbers and types of programmed instructions.

The memory 24 in the web site analyzer computing device 12 stores these programmed instructions for one or more aspects of the present invention as described and illustrated herein, although some or all of the programmed instructions could be stored and/or executed elsewhere. A variety of different types of memory storage devices, such as a random access memory (RAM), a read only memory (ROM), solid state drives, flash, or other computer readable medium which is read from and/or written to by a magnetic, optical, or other reading and/or writing system that is coupled to the processor 22, can be used for the memory 24 in the web site analyzer computing device 12.

In this particular example, the memory 24 includes a JavaScript environment emulator 32, a web service engine 34, a data collector engine 36, data collector event handlers 38, and a startup configuration file 40, although other types or numbers of modules or applications can be included in the memory 24 in other examples. By way of example only, the JavaScript environment emulator 32, web service engine 34, and/or data collector engine 36, can be implemented as executable modules of programmed instructions and/or configurable hardware logic for one or more of aspects of the technology described and illustrated herein, which are stored in the memory 24 and executed by the processor 22 in the web site analyzer computing device 12.

The JavaScript environment emulator 32 in this example can include programmed instructions and/or hardware logic configured to simulate a JavaScript environment for executing JavaScript code that may be included in web pages, as described and illustrated in more detail below. By way of example only, a JavaScript environment emulator 20 is illustrated and described in U.S. patent application Ser. No. 12/802,670 entitled, "Methods For Utilizing A JavaScript Emulator In A Web content proxy Server And Devices Thereof," which is incorporated herein by reference in its entirety.

The web service engine 34 in this example can include programmed instructions and/or hardware logic configured to execute web services. Web services provide a standardized way of integrating web-based applications using eXtensible Markup Language (XML) and/or REpresentational State Transfer (REST) (e.g., using Java Universal Description Discovery and Integration (jUDDI) and/or a Swagger™ framework for a description standard) over an Internet Protocol (IP) backbone.

In this particular example, the web service engine 34 executes web services that execute web pages obtained from the server devices 18(1)-18(n) in an emulated JavaScript environment using the JavaScript environment emulator 32, extract information from the web pages, and return web service responses in a preconfigured format. By executing the web pages in an emulated JavaScript environment, the web services are able to extract information from client-side JavaScript code, as described and illustrated in more detail later. The returned web service responses can include pending jobs, as well as start and end jobs that indicate data collector event handlers 38 and include information regarding the analyzed web pages that the data collector event handlers 38 use to generate an output resource, as described and illustrated in more detail later.

The data collector engine 34 in this example can include programmed instructions and/or hardware logic configured to process web service responses including the jobs included therein. Accordingly, the data collector engine 34 collects and executes pending jobs and calls the data collector event handlers 38 for start and end jobs, as described and illustrated in more detail later.

The data collector event handlers 38 in this example are JavaScript functions that are called by the data collector engine 34 and take in start and end jobs as parameters. Based on the start and end jobs passed as parameters, the data collector event handlers 38 updates an output resource, also as described and illustrated in more detail later.

The startup configuration file 40 includes an indication of an initial web service to be called as well as a URL of an initial web page of a web site to be analyzed. Optionally, the startup configuration file 40 further includes a maximum number of web pages to process or a function callback configured to validate the output resource, for example, although the startup configuration file 40 can also include other information.

One or more of the JavaScript environment emulator 32, web service engine 34, and/or data collector engine 36, can also have other types and numbers of functions as described and illustrated herein. Additionally, one or more of the JavaScript environment emulator 32, web service engine 34, data collector engine 36, data collector event handlers 38, or startup configuration file 40 can be stored at and/or implemented by a separate device coupled to the web site analyzer computing device 12 by one or more of the communication network(s) 16 and 20, such as one or more of the web server devices 18(1)-18(n).

The communication interface 28 in the web site analyzer computing device 12 is used to operatively couple and communicate between the web site analyzer computing device 12, the client devices 14(1)-14(n) and the server devices 18(1)-18(n) via the communication network(s) 16 and 20, although other types and numbers of communication networks with other types and numbers of connections and configurations can be used. Additionally, one or more of the communication network(s) 16 and 20 can include one or more local area networks (LANs) and/or wide area networks (WANs). By way of example only, the communication network(s) 16 and 20 can use TCP/IP over Ethernet and industry-standard protocols, including hypertext transfer protocol (HTTP), secure HTTP (HTTPS), wireless application protocol (WAP), and/or SOAP, although other types and numbers of communication networks each having their own communications protocols, can be used.

The client devices 14(1)-14(n) in this example enable a user to request, receive, and interact with applications, web services, and content hosted by the server devices 18(1)-18(n) through the web site analyzer computing device 12 via one or more communication network(s) 16, although one or more of the client devices 14(1)-14(n) could access content and utilize other types and numbers of applications from other sources and could provide a wide variety of other functions for the user. In some examples, the client devices 14(1)-14(n) comprise mobile computing devices with Internet access that enable one or more web services to be accessed. By way of example only, the client devices 14(1)-14(n) can be smart phones, personal digital assistants, or computers.

Each of the client devices 14(1)-14(n) includes one or more processors, a memory, a user input device, a display device, and a communication interface, which are coupled together by a bus or other communication link, although one or more of client devices 14(1)-14(n) can include other numbers and types of components, parts, devices, systems, and elements in other configurations. The processor(s) in the client devices 14(1)-14(n) can execute a program of instructions stored in the memory of the client devices 14(1)-14(n) for one or more aspects of this technology as described and illustrated herein, although the processor(s) could execute other numbers and types of programmed instructions.

The user input device in the client devices 14(1)-14(n) can be used to input selections, such as a request for a particular web site, although the user input device could be used to input other types of requests and data and interact with other elements. The user input device can include keypads, touch screens, and/or vocal input processing systems although other types and numbers of user input devices can be used.

The display device the client devices 14(1)-14(n) can be used to output data and information to the user, such as a requested web page by way of example only. The display device in the client devices 14(1)-14(n) can be a phone screen display, although other types and numbers of display devices could be used depending on the particular type of client device. The communication interface in the client devices 14(1)-14(n) can be used to operatively couple and communicate between the client devices 14(1)-14(n), the web site analyzer computing device 12, and the server devices 18(1)-18(n) over the communication networks 16 and 20.

The server devices 18(1)-18(n) provide content including web pages for use by one or more of the client devices 14(1)-14(n) or to be analyzed by the web site analyzer computing device 12, although the server devices 18(1)-18(n) can provide other numbers and types of functions. Each of the server devices 14(1)-14(n) in this example includes one or more processors, a memory, and a communication interface which are coupled together by a bus or other communication link, although each of the web server devices 18(1)-18(n) could have other numbers and types of components, parts, devices, systems, and elements in other configurations and locations.

The processor in each of the server devices 18(1)-18(n) executes a program of instructions stored in the memory of the server devices 18(1)-18(n) for one or more aspects of this technology, as described and illustrated by way of the examples herein, although the processor could execute other numbers and types of programmed instructions. The communication interface in each of the server devices 18(1)-18(n) is used to operatively couple and communicate between the server devices 18(1)-18(n), the web site analyzer computing device 12, and the client devices 14(1)-14(n) via communication networks 16 and 20.

Although the exemplary web site analyzer computing device 12, client devices 14(1)-14(n), and server devices 18(1)-18(n), are described and illustrated herein, each of the web site analyzer computing device 12, client devices 14(1)-14(n), and server devices 18(1)-18(n), can be implemented on any suitable computer apparatus or computing device. It is to be understood that the apparatuses and devices of the embodiments described herein are for exemplary purposes, as many variations of the specific hardware and software used to implement the embodiments are possible, as will be appreciated by those skilled in the relevant art(s).

The examples of this technology described and illustrated herein may also be implemented on computer apparatuses or devices that extend across any suitable network using any suitable interface mechanisms and communications technologies, including by way of example only telecommunications in any suitable form (e.g., voice and modem), wireless communications media, wireless communications networks, cellular communications networks, G3 communications networks, Public Switched Telephone Network (PSTNs), Packet Data Networks (PDNs), the Internet, intranets, and combinations thereof.

The examples of this technology described and illustrated herein may also be embodied as one or more non-transitory computer readable media having instructions stored thereon for one or more aspects of this technology, as described and illustrated by way of the embodiments herein, which when executed by a processor, cause the processor to carry out the steps necessary to implement the methods of the examples, as described and illustrated herein.

Figure 2:
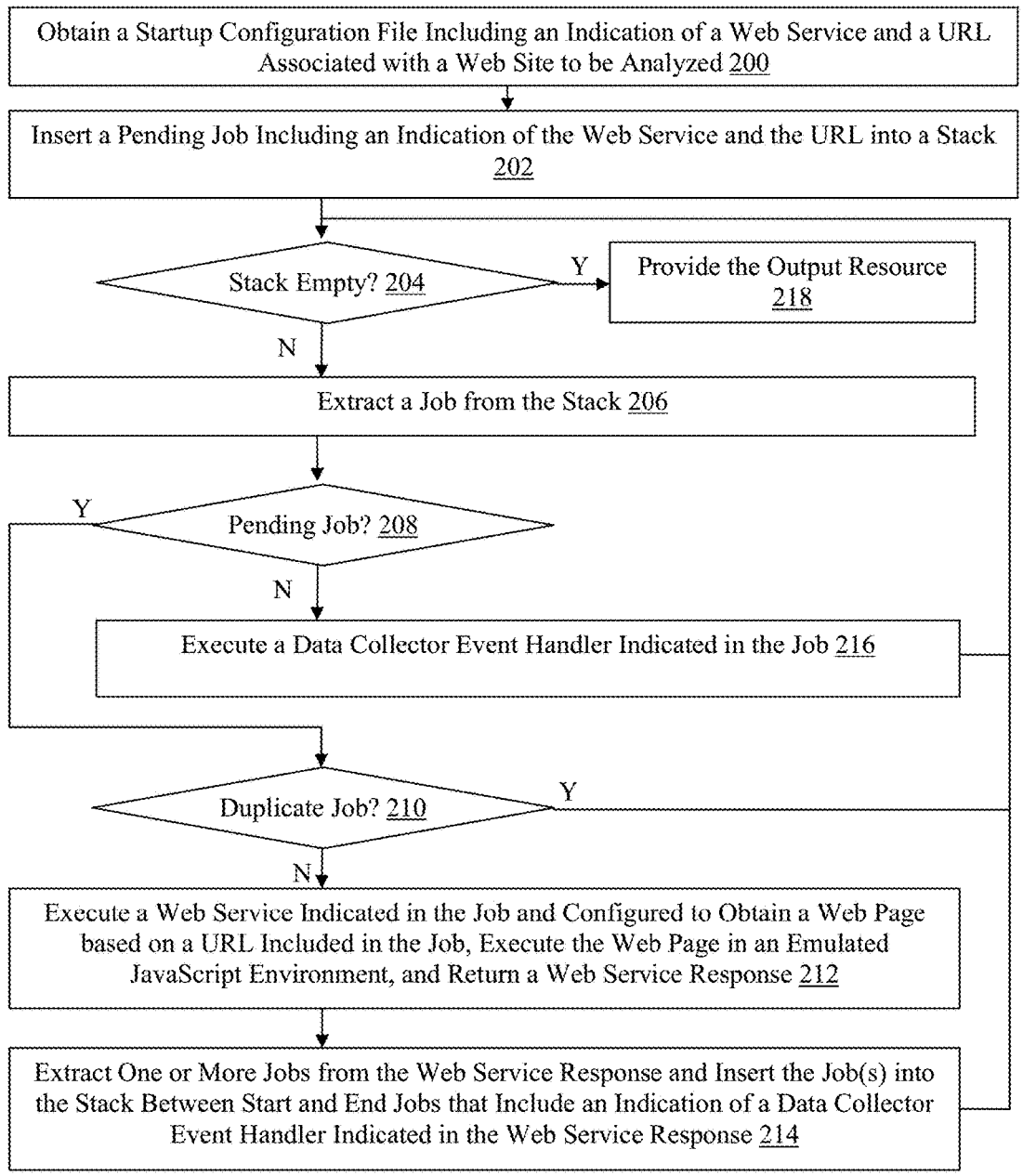
FIG. 2 is a flow chart of an exemplary method for analyzing web sites using web services and the exemplary web site analyzer computing device of FIG. 1.

An exemplary method for analyzing web sites using web services will now be described with reference to FIGS. 1-7. Referring more specifically to FIG. 2, in step 200 in this particular example, the web site analyzer computing device 12 obtains the startup configuration file 40 from the memory 24 or from another location or network device. The startup configuration file includes at least a Uniform Resource Locator (URL) associated with a web site to be analyzed, such as a URL of a home web page for the web site, and an indication of a web service that is the initial web service that will initiate the analysis of the web site, as described and illustrated in more detail later. Optionally, the startup configuration file 40 can include other configuration information, such as a maximum number of web pages to process or a function callback configured to validate an output resource corresponding to a result of the analysis, for example, although other configuration information can also be included in the startup configuration file 40.

In step 202 in this example, the web site analyzer computing device 12 inserts a pending job including an indication of the web service and the URL included in the startup configuration file into a last-in-first-out (LIFO) data structure, which is referred to herein as a stack. The LIFO structure facilitates a depth-first inspection of the web pages of the web site, as described and illustrated in more detail later. In this particular example, a job is a structured record that can have a type indicating that the job is a pending job, a start job, or an end job.

A pending job in this example includes at least an indication of a web service, an indication of an endpoint of the web service, and a URL of a web page to be analyzed, and optionally also includes a name or a canonical URL associated with the URL of the web page to be analyzed. A start job in this example includes at least an indication of one of the data collector event handlers 38 and optionally also includes a name or the content of an analyzed web page obtained based on the execution of the web page in the emulated JavaScript environment, as described and illustrated in more detail later. In this example, an end job includes at least an indication of one of the data collector event handlers 38, and optionally also includes a name. Other types of information can also be included in one or more of the jobs and jobs having other types can also be used in other examples.

Referring to FIG. 3A, an exemplary stack 300 including a portion of a pending job generated based on the startup configuration file 40 is illustrated. In this example, the web site analyzer computing device 12 generates the job 302 to have a pending type, an indication of the "root" web service included in the startup configuration file 40, and the "http://acme.com" URL included in the startup configuration file 40. Subsequent to generating the job 302, the web site analyzer computing device 12 inserts the job 302 into the stack 300.

Referring back to FIG. 2, in step 204 in this example, the web site analyzer computing device 12 determines whether the stack 300 is empty. In the first iteration, the stack 300 will never be empty. Accordingly, if the web site analyzer computing device 12 determines that the stack is not empty, then the No branch is taken to step 206. In step 206 in this example, the web site analyzer computing device 12 extracts a job from the stack 300, which is pending job 302 in the first iteration in this example.

In step 208 in this example, the web site analyzer computing device 12 determines whether the extracted job is a pending job based on a type identified in the job. In the first iteration, the job 302 generated based on the information contained in the startup configuration file 40 will always be of a pending type. Other nomenclature can also be used in other examples to indicate that a job includes an indication of a web service and a URL. Accordingly, if the web site analyzer computing device 12 determines that the job 302 is a pending job, then the Yes branch is taken to step 210.

In step 210 in this example, the web site analyzer computing device 12 optionally determines whether the extracted job 302 is a duplicate job. In the first iteration in this example, the job 302 will never be a duplicate job. However, in subsequent iterations, a canonical URL included in the job can be compared by the web site analyzer computing device 12 to a stored set of canonical URLs associated with previously analyzed web pages. The canonical URL can be included in the job by a web service that generate a web service response defining the job, as described and illustrated in more detail later. If the web site analyzer computing device 12 determines that the canonical URL included in the job matches one of the stored set of canonical URLs, then the web site analyzer computing device 12 will determine that the job is a duplicate job and take the Yes branch from step 210 back to step 204 without performing steps 212 and 214 for the job.

However, if the web site analyzer computing device 12 determines that the canonical URL included in the job does not match one of the stored set of canonical URLs, then the web site analyzer computing device 12 will determine that the job is not a duplicate job. If the web site analyzer computing device 12 determines that the job is not a duplicate job, then the canonical URL included in the job can be added to the stored set of canonical URLs to facilitate subsequent identification of duplicate jobs. By configuring the web services to include canonical URLs in definitions of jobs in web service responses, and performing the comparison in step 210, the web site analyzer computing device 12 can avoid entering an infinite loop that could otherwise occur based on the topologies of some web site. Accordingly, if the web site analyze computing device 12 determines that the job 302 extracted in step 216 is not a duplicate job, then the No branch is taken from step 210 to step 212.

In step 212 in this example, the web site analyzer computing device 12 executes a web service indicated in the job 302, which is the "root" web service in job 302 in this example. The web service is configured to obtain the web page corresponding to the URL included in the job 302, execute the web page in an emulated JavaScript environment provided by the JavaScript Environment emulator 32, and return a web service response. By executing the web page in an emulated JavaScript environment, the web service is advantageously able to collect information from the web page that is only accessible by executing client-site JavaScript code. Accordingly, the web site analyzer computing device 12 calls the "root" web service in this example and passes the "http://acme.com" URL to the "root" web service as a parameter.

In step 214 in this example, the web site analyzer computing device 12 extracts one or more jobs from the web service response and insert the job(s) into the stack 300 between start and end jobs. Web service responses in this example include definitions of one or more job(s) and an indication of one of the data collector event handlers 38, and optionally also include a description the analyzed web page or a hash generated from the web page. The start and end jobs include an indication of one of the data collector event handlers 38 indicated in the web service response outside of the job definitions.

Referring to FIG. 3B, a portion of an exemplary web service response 304 generated by the "root" web service indicated in the pending job 302 in the stack 300 using the "http://acme.com" URL of the pending job 302 is illustrated. In this particular example, the "root" web service executes the web page corresponding to the "http://acme.com" URL and returns the web service response 304. The web service response identifies the "home" one of the data collector event handlers 38 (referred to in FIG. 3B as the "type"). The web service response 304 does not include a hash, but the optional hash can be used, in addition to or in place of the canonical URLs, to identify duplicated jobs based on web pages having corresponding content. The web service 304 also does not include any description of the web page (referring to in FIG. 3B as the "content"). However, the description can include content of the web page to be passed to one of the data collector event handlers 38, as described and illustrated in more detail later.

Additionally, the web service response 304 in this particular examples includes two job definitions, each of which identifies the same one of the data collector event handlers 38 (referred to as the "action" in FIG. 3B), which is the "plp" data collector event handler. Each of the jobs are defined to have a pending type and include a name, URL, and canonical URL, although other information can also be included in the job definitions in other examples. Optionally, the web services can be configured to define pending jobs based on specified criteria (e.g., type of URL associated with an identified the web page).

Referring to FIG. 3C, the stack 300 including a portion of each of the jobs resulting from processing of the exemplary web service response 304 of FIG. 3B is illustrated. In this particular example, the web site analyzer computing device 12 inserts a start job 306, pending jobs 308 and 310 extracted from the web service response 304, and an end job 312 into the stack 300. The pending jobs 308 and 310 include an indication of the "plp" one of the data collector event handlers 38 identified in the definition of each of the jobs 308 and 310 in the web service response 304. The web site analyzer computing device 12 inserts the pending jobs 308 and 310 into the stack between the start job 306 and the end job 312. Each of the start job 306 and the end job 312 includes an indication of the "home" one of the data collector event handlers 38 that is identified in the web service response 304.

Referring back to FIG. 2, subsequent to updating the stack 300 in step 214, the web site analyzer computing device 12 proceeds back to step 204 and again determines whether the stack 300 is empty. In this iteration in this example, the web site analyzer computing device 12 will again determine that the stack is not empty and will proceed to extract job 306 from the stack 300 in step 206. In step 208, the web site analyzer computing device 12 again determines whether the job is of a pending type. Since job 306 is a start job, the web site analyzer computing device 12 determines in this iteration that the extracted job is not a pending job and the No branch is taken to step 216.

In step 216 in this example, the web site analyzer computing device 12 executes one of the data collector event handlers 38 indicated in the job 306, which is the "home" one of the data collector event handlers 38 in this example. The data collector event handlers 38 are JavaScript functions that configured to update an output resource, although the data collector event handlers 38 can be written in other languages and can be configured to provide other functionality in other examples.

Referring to FIG. 4, a plurality of exemplary data collector event handlers 38(1)-38(6) that process jobs is illustrated. Accordingly, in this example, the job is a start job indicating the "home" data collector event handlers 38(1). Accordingly, the web site analyzer computing device 12 executes the data collector event handler 38(1) by passing the job 306 in this iteration. Upon execution, the data collector event handler 38(1) updates an output resource.

Referring to FIG. 5 an exemplary output resource 500 is illustrated. In this particular example the output resource is an eXtensible Markup Language (XML) document, but the output resource can be a JavaScript Object Notation (JSON) file, one or more records configured to be stored in a database, an e-mail or other electronic communication, or any other type of resource in other examples.

Accordingly, the data collector event handler 38(1) in this example is configured in this example to update the output resource 500 in this example to include a "<catalog>" start tag. In other examples, one or more of the data collector event handlers 38, such as data collector event handlers 38(3) and 38(5), for example, are configured to update the output resource based on content of the analyzed web page included in the job, as described and illustrated in more detail later.

However, in this example, subsequent to executing the data collector event handler 38(1) indicated in the extracted job 306 in step 216, the web site analyzer computing device 12 again proceeds back to step 204 and again determines whether the stack 300 is empty. Since the stack is not empty subsequent to the extraction of job 306, the web site analyzer computing device 12 will again take the no branch to step 206 and extract the job 308 from the stack 300. In this iteration, the extracted job 308 is a pending job and, accordingly, the web site analyzer computing device 12 will take the Yes branch from step 208 to step 210. Additionally, since the job 308 is not a duplicate job, the web site analyzer computing device 12 will take the No branch from step 210 to step 212.

In step 212 in this iteration, the web site analyzer computing device 12 will execute the "plp" web service indicated in the job 308 by passing the job 308 as a parameter. The "plp" web service in this iteration is configured to obtain the web page corresponding to the "http://acme.com/c2141" URL included in the job 308, executes the web page in an emulated JavaScript environment, and returns a web service response, such as the web service response 600 illustrated in FIG. 6A, for example.

In this example, the web service response 600 identifies a "plp" one of the data collector event handlers 38, a description of the web page, and four jobs including two start and two end jobs. Referring back to FIG. 2, in step 214 in this iteration, the web site analyzer computing device extracts the four jobs from the web service response 600 and inserts the four jobs into the stack 300 between start and end jobs that include an indication of the "plp" one of the data collector event handlers 38.

Referring to FIG. 6B, the stack 300 subsequent to step 214 in this iteration is illustrated. Accordingly, the four jobs defined in the web service response 600 are jobs 602, 604, 606, and 608, and jobs 602, 604, 606, and 608 are inserted into the stack 300 between start job 610 and end job 612. Accordingly, jobs 602-612 will be processed before steps 310 and 312 resulting in a depth-first inspection of the web site due to the LIFO structure of the stack. Referring back to FIG. 2, subsequent to extracting the jobs 602, 604, 606, and 608 and inserting the jobs 602, 604, 606, 608, 610, and 612 into the stack 300, the web site analyzer computing device 12 proceeds back to step 204.

In this iteration, the web site analyzer computing device 12 will again determine that the stack 300 is not empty and take the No branch from step 204 to step 206. In step 206, the web site analyzer computing device 12 extracts job 610 from the stack. Job 610 is not a pending job and, accordingly, the website analyzer computing device 12 will take the No branch from step 208 to step 216. In step 216 in this iteration, the web site analyzer computing device 12 executes the data collector event handler 38(3) corresponding to the "plp" data collector event handler indicated in the job 610, as included based on the web service response 600, by passing the job 610 as a parameter.

As illustrated in FIG. 4, the data collector event handler 38(3) is configured to update the output resource to include the URL, name, and content from the job 610, as included in the definition of the job 610 in the web service response 600. Accordingly, the exemplary output resource 500 illustrated in FIG. 5 is updated to include the second through seventh lines of XML code, which correspond to the "http://acme.com/c2141/women_dresses" URL, "women dresses" name, and "Create the perfect holiday wardrobe with 20% off swim and beachwear" description or content, and associated tags and XML code.

Referring back to FIG. 2, subsequent to executing the data collector event handler 38(3) indicated in the job 610, the web site analyzer computing device 12 again proceeds to step 204 and determines whether the stack is empty. Accordingly, the web site analyzer computing device 12 repeats steps 204, 206, 208, and 216, as described and illustrated earlier, for jobs 602, 604, 606, 608, and 612. Subsequent to processing jobs 602, 604, 606, 608, and 612, in another iteration, the web site analyzer computing device 12 will again determine in step 204 that the stack 300 is not empty and take the No branch to step 206.

In step 206 in this iteration, the web site analyzer computing device 12 extracts job 310 and performs steps 208 and 210 for job 310. In step 212 in this iteration, the "plp" web service is executing by passing the "http://acme.com/c1550" URL indicated in the job 310. The "plp" web service returns the web service response 700, as illustrated in FIG. 7A in this example, which includes four jobs including two start and two end jobs. Accordingly, in step 214 in this iteration, the web site analyzer computing device 12 inserts the four jobs 702, 704, 706, and 708 between start job 710 and end job 712, resulting in the stack 300 illustrated in FIG. 7B.

Accordingly, referring back to FIG. 2, the web site analyzer computing device 12 then proceeds to perform steps 204, 206, 208, and 216 for jobs 710, 702, 704, 706, 708, 712, and 312. Subsequent to executing the data collector event handler 38(2) indicated in the job 312 in step 216, the web site analyzer computing device 12 proceeds back to step 204. Since there are no pending jobs in the stack 300 illustrated in FIG. 7B, the web site analyzer computing device 12 will not execute any web services while processing jobs 710, 702, 704, 706, 708, 712, and 312, and will not therefore insert any new jobs into the stack 300.

Accordingly, in the next iteration subsequent to processing job 312, the web site analyzer computing device 12 will determine in step 204 that the stack 300 is empty and the Yes branch will be taken to step 218. In step 218, the web site analyzer computing device 12 provides the output resource. The output resource 500 can be provided to a bot, a spider, or an indexer, for example, or any other type of application. Alternatively, as in the example describe and illustrated herein, the output resource 500 can be used to generate a mobile navigation menu, although different types of output resources can be generated and the output resource 500 can be used for different purposes or to facilitate different functionality in other examples.

Thus, as illustrated and described herein this technology provides a number of advantages including methods, non-transitory computer readable media, and web site analyzer computing devices that more effectively navigate web sites to collect information. With this technology, web services execute web pages in emulated JavaScript environments, which advantageously allows the web services to access and evaluate client-side JavaScript code and results in a more thorough and accurate inspection of the web pages.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for optimized analysis of structure or content of a web site, including one or more particular web pages included therein, using web services and an emulated JavaScript environment, the method implemented by one or more web site analyzer computing devices and comprising:
   determining when a job extracted from a stack has a pending type and, when the determination indicates that the job has a pending type:
      passing a Uniform Resource Locator (URL) included in the job as a parameter to a web service indicated in the job;
      obtaining, by the web service indicated in the job, from a web server device, and based on the URL included in the job, a web page, executing, by the web service, the web page in an emulated JavaScript environment, and returning, by the web service, a web service response; and
      extracting another job from the web service response and inserting the another job into the stack; and
   when the determination indicates that the job does not have a pending type:
      passing the job as a parameter to a data collector event handler indicated in the job, wherein the data collector event handler comprises a JavaScript function configured to update an output resource based on content of the analyzed web page included in the job extracted from the stack.

2. The method as set forth in claim 1, further comprising, when the determination indicates that the job has a pending type:
   determining when the job is a duplicate job based on a canonical URL included in the job;
   storing the canonical URL, when the determination indicates that the job is not a duplicate job; and
   extracting an additional job from the stack, without executing the web service indicated in the job, extracting the another job from the web service response, or inserting the another job into the stack, when the determination indicates that the job is a duplicate job.

3. The method as set forth in claim 1, further comprising, when the determination indicates that the job has a pending type, inserting an end job having an end type into the stack before the another job and inserting a start job having a start type into the stack after the another job, wherein the start and end jobs identify another data collector event handler indicated in the web service response.

4. The method as set forth in claim 1, wherein the data collector event handler is a JavaScript function, the web service response comprises one or more of the another job, an indication of another data collector event handler, a description of the web page, or a hash generated from the web page, and the job comprises a structured record and has:
   a pending type and comprises one or more of the indication of the web service, an indication of an endpoint of the web service, the URL of the web page to be analyzed, a name, or a canonical URL;

a start type and comprises one or more of an indication of the data collector event handler, another name, or the content of the analyzed web page obtained based on the execution of the web page in the emulated JavaScript environment; or an end type and comprises one or more of the indication of the data collector event handler or the another name.

5. The method as set forth in claim 1, further comprising:

obtaining a startup configuration file comprising one or more of an indication of the web service, the URL, a maximum number of web pages to process, or a function callback configured to validate the output resource;

generating the job to have a pending type, an indication of the web service, and the URL; and inserting the job into the stack.

6. The method as set forth in claim 1, further comprising:

determining when the stack is empty; and providing the output resource when the determination indicates that the stack is empty, wherein the output resource comprises an eXtensible Markup Language (XML) document, a JavaScript Object Notation (JSON) file, one or more records configured to be stored in a database, or an e-mail or other electronic communication.

7. A non-transitory computer readable medium having stored thereon programmed instructions for optimized analysis of structure or content of a web site, including one or more particular web pages included therein, using web services and an emulated JavaScript environment comprising executable code that, when executed by at least one processor, causes the processor to:

determine when a job extracted from a stack has a pending type and, when the determination indicates that the job has a pending type:

pass a Uniform Resource Locator (URL) included in the job as a parameter to a web service indicated in the job;

obtain, by the web service indicated in the job, from a web server device, and based on the URL included in the job, a web page, execute, by the web service, the web page in an emulated JavaScript environment, and return, by the web service, a web service response; and extract another job from the web service response and insert the another job into the stack; and when the determination indicates that the job does not have a pending type:

pass the job as a parameter to a data collector event handler indicated in the job, wherein the data collector event handler comprises a JavaScript function configured to update an output resource based on content of the analyzed web page included in the job extracted from the stack.

8. The non-transitory computer readable medium as set forth in claim 7, wherein the executable code, when executed by the processor, further causes the processor to, when the determination indicates that the job has a pending type:

determine when the job is a duplicate job based on a canonical URL included in the job;

store the canonical URL, when the determination indicates that the job is not a duplicate job; and extract an additional job from the stack, without executing the web service indicated in the job, extracting the another job from the web service response, or inserting the another job into the stack, when the determination indicates that the job is a duplicate job.

9. The non-transitory computer readable medium as set forth in claim 7, wherein the executable code, when executed by the processor, further causes the processor to, when the determination indicates that the job has a pending type, insert an end job having an end type into the stack before the another job and inserting a start job having a start type into the stack after the another job, wherein the start and end jobs identify another data collector event handler indicated in the web service response.

10. The non-transitory computer readable medium as set forth in claim 7, wherein the data collector event handler is a JavaScript function, the web service response comprises one or more of the another job, an indication of another data collector event handler, a description of the web page, or a hash generated from the web page, and the job comprises a structured record and has:

a pending type and comprises one or more of the indication of the web service, an indication of an endpoint of the web service, the URL of the web page to be analyzed, a name, or a canonical URL;

a start type and comprises one or more of an indication of the data collector event handler, another name, or the content of the analyzed web page obtained based on the execution of the web page in the emulated JavaScript environment; or an end type and comprises one or more of the indication of the data collector event handler or the another name.

11. The non-transitory computer readable medium as set forth in claim 7, wherein the executable code, when executed by the processor, further causes the processor to:

obtain a startup configuration file comprising one or more of an indication of the web service, the URL, a maximum number of web pages to process, or a function callback configured to validate the output resource;

generate the job to have a pending type, an indication of the web service, and the URL; and insert the job into the stack.

12. The non-transitory computer readable medium as set forth in claim 7, wherein the executable code, when executed by the processor, further causes the processor to:

determine when the stack is empty; and provide the output resource when the determination indicates that the stack is empty, wherein the output resource comprises an eXtensible Markup Language (XML) document, a JavaScript Object Notation (JSON) file, one or more records configured to be stored in a database, or an e-mail or other electronic communication.

13. A web site analyzer computing device, comprising memory comprising programmed instructions stored thereon and one or more processors coupled to the memory and configured to execute the stored programmed instructions to:

determine when a job extracted from a stack has a pending type and, when the determination indicates that the job has a pending type:

pass a Uniform Resource Locator (URL) included in the job as a parameter to a web service indicated in the job;

obtain, by the web service indicated in the job, from a web server device, and based on the URL included in the job, a web page, execute, by the web service, the web page in an emulated JavaScript environment, and return, by the web service, a web service response; and extract another job from the web service response and insert the another job into the stack; and when the determination indicates that the job does not have a pending type:

pass the job as a parameter to a data collector event handler indicated in the job, wherein the data collector event handler comprises a JavaScript function configured to update an output resource based on content of the analyzed web page included in the job extracted from the stack.

14. The web site analyzer computing device as set forth in claim 13, wherein the processors are further configured to execute the stored programmed instructions to, when the determination indicates that the job has a pending type:

determine when the job is a duplicate job based on a canonical URL included in the job;

store the canonical URL, when the determination indicates that the job is not a duplicate job; and extract an additional job from the stack, without executing the web service indicated in the job, extracting the another job from the web service response, or inserting the another job into the stack, when the determination indicates that the job is a duplicate job.

15. The web site analyzer computing device as set forth in claim 13, wherein the processors are further configured to execute the stored programmed instructions to, when the determination indicates that the job has a pending type, insert an end job having an end type into the stack before the another job and inserting a start job having a start type into the stack after the another job, wherein the start and end jobs identify another data collector event handler indicated in the web service response.

16. The web site analyzer computing device as set forth in claim 13, wherein the data collector event handler is a JavaScript function, the web service response comprises one or more of the another job, an indication of another data collector event handler, a description of the web page, or a hash generated from the web page, and the job comprises a structured record and has:

a pending type and comprises one or more of the indication of the web service, an indication of an endpoint of the web service, the URL of the web page to be analyzed, a name, or a canonical URL;

a start type and comprises one or more of an indication of the data collector event handler, another name, or the content of the analyzed web page obtained based on the execution of the web page in the emulated JavaScript environment; or an end type and comprises one or more of the indication of the data collector event handler or the another name.

17. The web site analyzer computing device as set forth in claim 13, wherein the processors are further configured to execute the stored programmed instructions to:

obtain a startup configuration file comprising one or more of an indication of the web service, the URL, a maximum number of web pages to process, or a function callback configured to validate the output resource;

generate the job to have a pending type, an indication of the web service, and the URL; and insert the job into the stack.

18. The web site analyzer computing device as set forth in claim 13, wherein the processors are further configured to execute the stored programmed instructions to:

determine when the stack is empty; and provide the output resource when the determination indicates that the stack is empty, wherein the output resource comprises an eXtensible Markup Language (XML) document, a JavaScript Object Notation (JSON) file, one or more records configured to be stored in a database, or an e-mail or other electronic communication.

* * * * *